United States Patent
Gonen et al.

(10) Patent No.: US 11,293,883 B2
(45) Date of Patent: Apr. 5, 2022

(54) METHODS AND COMPOSITIONS FOR MICRO-ELECTRON DIFFRACTION

(71) Applicant: Howard Hughes Medical Institute, Chevy Chase, MD (US)

(72) Inventors: Tamir Gonen, Chevy Chase, MD (US); Michael W. Martynowycz, Chevy Chase, MD (US); Johan Hattne, Chevy Chase, MD (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 325 days.

(21) Appl. No.: 16/672,040

(22) Filed: Nov. 1, 2019

(65) Prior Publication Data
US 2020/0158665 A1  May 21, 2020

Related U.S. Application Data

(60) Provisional application No. 62/755,200, filed on Nov. 2, 2018.

(51) Int. Cl.
*G01N 23/20058* (2018.01)
*G01N 1/32* (2006.01)
(Continued)

(52) U.S. Cl.
CPC ......... *G01N 23/20058* (2013.01); *G01N 1/28* (2013.01); *G01N 1/32* (2013.01);
(Continued)

(58) Field of Classification Search
CPC ....... G01N 23/20058; G01N 23/20008; G01N 23/2251; G01N 1/32; G01N 1/286;
(Continued)

(56) References Cited

U.S. PATENT DOCUMENTS 8,076,640 B2   12/2011   Koch
8,253,099 B2   8/2012   Nicolopoulos et al.
(Continued)

OTHER PUBLICATIONS

Hattne et al., "MicroED with the Falcon III direct electron detector," IUCrJ, research papers, 2019, 921-926.
(Continued)

*Primary Examiner* — Kiet T Nguyen
(74) *Attorney, Agent, or Firm* — Fish & Richardson P.C.

(57) ABSTRACT

A sample preparation method includes disposing a microcrystal on an electrically conductive grid, coating the microcrystal with an electrically conductive material to yield a coated microcrystal, milling the coated microcrystal with a first ion beam to yield a milled microcrystal, and polishing the milled microcrystal with a second ion beam to yield a polished microcrystal. A length of a side of the milled microcrystal is between about 250 nm and about 500 nm, and a length of the corresponding side of the polished microcrystal is between about 150 nm and about 250 nm. Assessing the crystal structure of the polished microcrystal includes rotating the polished microcrystal while accelerating electrons toward the polished microcrystal, diffracting the electrons from the polished microcrystal to yield a multiplicity of diffraction patterns, and assessing, from the multiplicity of diffraction patterns, the crystal structure of the polished microcrystal.

20 Claims, 2 Drawing Sheets

(51) Int. Cl.
*G01N 23/20008* (2018.01)
*G01N 1/28* (2006.01)
*G01N 23/2251* (2018.01)

(52) U.S. Cl.
CPC ... *G01N 23/20008* (2013.01); *G01N 23/2251* (2013.01); *G01N 2223/604* (2013.01); *H01J 2237/31745* (2013.01)

(58) Field of Classification Search
CPC ...... G01N 1/44; G01N 1/28; G01N 2223/604; H01J 2237/31745
USPC .................................................. 250/307, 306
See application file for complete search history.

(56) References Cited

U.S. PATENT DOCUMENTS

| | | | |
|---|---|---|---|
| 8,921,783 B2 | 12/2014 | Billinge et al. | |
| 9,390,888 B2 | 7/2016 | Wu et al. | |
| 10,170,275 B2 | 1/2019 | Mitchels et al. | |
| 10,401,265 B1* | 9/2019 | Porter | H01J 37/28 |
| 2007/0243620 A1 | 10/2007 | Bates et al. | |
| 2010/0108883 A1 | 5/2010 | Zewail | |
| 2010/0155620 A1* | 6/2010 | Hutchison | H01J 37/20 250/440.11 |
| 2011/0106455 A1 | 5/2011 | Billinge et al. | |
| 2020/0264115 A1* | 8/2020 | Phaneuf | G01N 23/2255 |

OTHER PUBLICATIONS

Martynowycz et al., "Qualitative Analyses of Polishing and Precoating FIB Milled Crystals for MicroED," Structure 27, Oct. 1, 2019, pp. 1-7.

Martynowycz et al., "Experimental phasing of MicroED data using radiation damage," bioRxiv, Oct. 25, 2019, 19 pages.

Ting et al., "Use of a scaffold peptide in the biosynthesis of amino acid-derived natural products," Science 365, Jul. 19, 2019, pp. 280-284.

Dick et al., "Tailoring Tryptophan Synthase TrpB for Selective Quaternary Carbon Bond Formation," J, Am, Chern, Soc., 2019, 141, p. 19817-19822.

* cited by examiner

200

```
┌─────────────────────────────────────────┐
│ Rotating a polished microcrystal while  │
│ accelerating electrons toward the polished │
│ microcrystal.                           │
│                                     202 │
└─────────────────────────────────────────┘
                    │
                    ▼
┌─────────────────────────────────────────┐
│ Diffracting the electrons from the polished │
│ microcrystal to yield a multiplicity of diffraction │
│ patterns.                               │
│                                     204 │
└─────────────────────────────────────────┘
                    │
                    ▼
┌─────────────────────────────────────────┐
│ Assessing, from the multiplicity of diffraction │
│ patterns, the crystal structure of the polished │
│ microcrystal.                           │
│                                     206 │
└─────────────────────────────────────────┘
```

*FIG. 2*

METHODS AND COMPOSITIONS FOR MICRO-ELECTRON DIFFRACTION

CROSS-REFERENCE TO RELATED APPLICATION

This applications claims the benefit of U.S. Provisional Application No. 62/755,200 entitled "METHODS AND COMPOSITIONS FOR MICRO-ELECTRON DIFFRACTION" and filed on Nov. 2, 2018, which is incorporated by reference herein in its entirety.

TECHNICAL FIELD

This disclosure generally relates to methods and compositions for micro-electron diffraction.

BACKGROUND

Microcrystal electron diffraction (MicroED) is a cryogenic electron microscopy (cryoEM) method with which structures of macromolecular assemblies (e.g., proteins) are solved to atomic resolution from nanocrystals about one billion times smaller than that typically used for X-ray crystallography. These nanocrystals either grow spontaneously in sparse matrix crystallization trays or, when large crystals are obtained, can be sonicated or broken down to small crystallite fragments for MicroED. The strong interaction between matter and electrons limits the thickness of crystals that can be investigated by MicroED, mainly due to absorption. Once suitable samples are available, the grid is prepared and data is collected. Typically, the crystallite solution is pipetted onto the holey carbon grid, excess solution is blotted away, and the preparation plunged into ethane to create a layer of thin, amorphous ice embedding the crystallites. Many things can go wrong in the process. For example, the blotting might mechanically destroy the crystals; inefficient blotting may lead to very thick or very thin ice or lots of ice contamination on the grid; finally, the ice thickness can affect the hydration of the crystals and may deteriorate the underlying crystalline lattice.

SUMMARY

Use of a focused ion beam to generate lamellae of macromolecular protein crystals for continuous rotation microcrystal electron diffraction (MicroED) is demonstrated. The lamellae are of ideal thickness, easy to locate, and require no blotting optimization. In this manner, crystals of nearly any size may be scooped and milled to suitable dimensions prior to data collection, thus streamlining the methodology for sample preparation for MicroED.

In a first general aspect, a sample preparation method includes disposing a microcrystal on an electrically conductive grid, coating the microcrystal with an electrically conductive material to yield a coated microcrystal, milling the coated microcrystal with a first ion beam to yield a milled microcrystal, and polishing the milled microcrystal with a second ion beam to yield a polished microcrystal. A length of a side of the milled microcrystal is between about 250 nm and about 500 am. Polishing the milled microcrystal reduces the length of the side of the milled microcrystal to yield a polished microcrystal having a length of a corresponding side between about 150 nm and about 250 nm.

Implementations of the first general aspect may include one or more of the following features.

The microcrystal typically includes a macromolecule (e.g., a protein, nucleic acid, or polymer). In some cases, the microcrystal includes small organic compounds and inorganic compounds. Coating the microcrystal typically includes forming a layer having a thickness between about 25 nm and about 100 nm on the microcrystal. The electrically conductive material includes a metal (e.g., platinum, silver, or chromium) or carbon. The first ion beam, the second ion beam, or both may include gallium ions. Milling the coated microcrystal may include reducing a current of the ion beam by about a factor of ten (e.g., reducing a current of the ion beam from about 300 pA to about 30 pA). In some cases, milling of the coated microcrystal is monitored with an electron microscope. Polishing the milled microcrystal may include irradiating the milled microcrystal with an ion beam having a current between about 5 pA and about 25 pA. Polishing the milled microcrystal may reduce the length of the side of the milled microcrystal by about 50 nm to about 100 nm. A distance between an edge of the polished microcrystal and a bar of the electrically conductive grid is typically at least about 20 microns, and a distance between an edge of the polished microcrystal and an edge of an additional polished microcrystal on the electrically conductive grid is at least about 10 microns.

In a second general aspect, assessing the crystal structure of the polished microcrystal of the first general aspect includes rotating the polished microcrystal while accelerating electrons toward the polished microcrystal, diffracting the electrons from the polished microcrystal to yield a multiplicity of diffraction patterns, and assessing, from the multiplicity of diffraction patterns, the crystal structure of the polished microcrystal.

Implementations of the second general aspect may include one or more of the following features.

A resolution of the crystal structure is less than about 3 Å or between about 1 Å and about 2 Å. A completeness of the crystal structure is at least about 85%. Rotating the polished microcrystal covers a total angular range of at least 60° of the polished microcrystal. A total exposure of the polished microcrystal is typically less than about 35 e$^-$Å$^{-2}$, and values of R$_{work}$ and R$_{free}$ corresponding to the crystal structure are typically between about 20% and about 30%.

Methods described in this disclosure advantageously allow macromolecular structures to be obtained from a single milled crystal. These methods widen the scope of crystals suitable for MicroED, streamline sample preparation, and decrease the time spent screening for crystals on the grid. Also, coating the microcrystals with a thin layer of electrically conductive material followed by milling and polishing the crystal surfaces prior to data collection yields superior results as indicated by higher signal-to-noise ratio, higher resolution, and better refinement statistics.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 2 is a flowchart showing operations in a microcrystal electron diffraction (MicroED) process.

DETAILED DESCRIPTION

Figure 1:
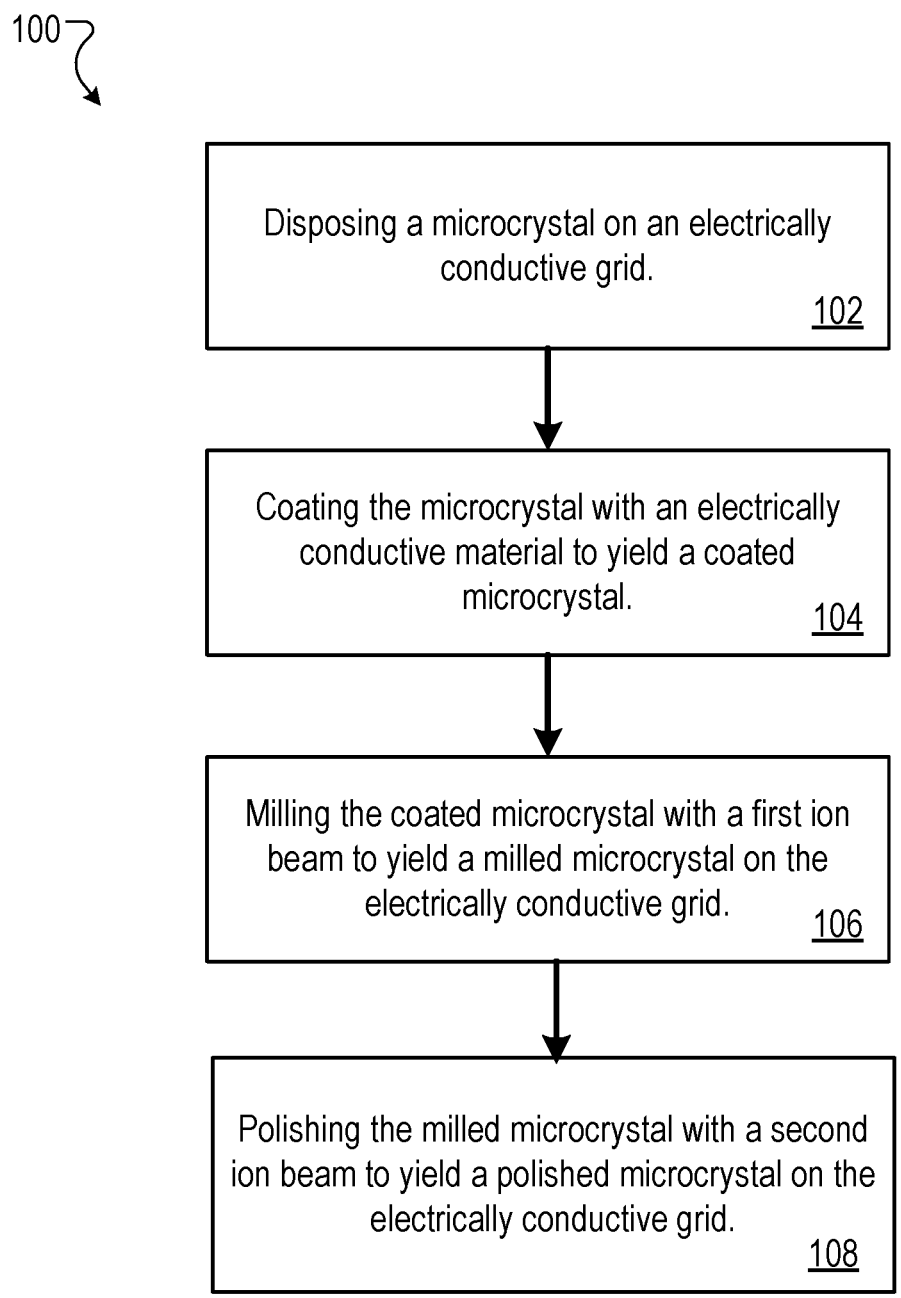
FIG. 1 is a flowchart showing operations in a microcrystal sample preparation process.

Microcrystal electron diffraction (MicroED) is a cryogenic electron microscopy (cryoEM) technique that uses a transmission electron microscope (TEM) to collect electron diffraction data from nanocrystals at cryogenic temperatures under continuous rotation. Electrons at commonly used accelerating voltages (80-300 kV) typically only penetrate samples less than ~1 mm thick due to the strong interaction between matter and the electron beam. Thin, uniform crystals are preferred for MicroED experiments, as this both reduces noise and eliminates the uncertainty about sample thickness. Machined crystals have been shown to retain their high-resolution information, allowing structure determination at near-atomic resolution.

Large crystals, several hundred micrometers in thickness, can be scooped directly onto an electron microscope (EM) grid, and some excess solution gently blotted manually before flash freezing in ethane. Using a focused ion beam (FIB), the surrounding ice and embedded crystals are then milled down to a desirable thickness for analysis by MicroED.

In FIB milling, the FIB rasters back and forth across the sample to remove unwanted material. In this way, the sample and surrounding material are exposed. High-speed ions deposit some fraction of their energy into the sample due to inelastic scattering. This exposure builds up while the crystal is milled, typically damaging the specimen either directly from ion bombardment or through secondary effects. Furthermore, the milling process is typically conducted at grazing incidence angles of ~18°, and therefore exposes large areas of the grid around the sample to high-energy gallium ions.

To protect the sample from the ion beam, a sample can be coated with an electrically conductive material prior to FIB milling for FIB-scanning electron microscopy (SEM) applications. One suitable example is platinum, which has high electrical conductivity and contrast in electron microscopy. Other suitable examples include silver, chromium, and carbon. This additional layer protects the sample from high-energy ions during imaging with either the electron or ion beam, improves contrast for biological materials, and reduces charging effects caused by the ion beams during imaging or milling. Such coating may also increase the long-term stability of the grid and help preserve the specimen for future investigations.

Thus, focused ion-beam (FIB) milling can thin crystals into lamellae of a suitable size for MicroED As used herein, a milled microcrystal of a suitable size has a length of a side up to about 1000 nm, up to about 500 nm, or up to about 250 nm. The effects of polishing the lamellae, whereby the last few nanometers are milled away using a low-current gallium beam, are demonstrated for platinum-precoated and uncoated samples. Precoating samples with a thin layer of platinum followed by polishing the crystal surfaces prior to data collection yields superior results as indicated by higher signal-to-noise ratio, higher resolution, and better refinement statistics. Polishing the milled microcrystal typically reduces the length of the side of the milled microcrystal from about 250-500 nm to about 150-250 nm (e.g., a reduction of at least about 50-100 nm).

FIG. 1 is a flowchart showing operations in a microcrystal sample preparation process 100. In 102, a microcrystal is disposed on an electrically conductive grid. Dimensions of the microcrystal are on the order of microns, and can be up to tens or hundreds of microns. The microcrystal typically includes a macromolecule (e.g., a protein, nucleic acid, or polymer). In some cases, the microcrystal includes a small organic or inorganic molecule. The electrically conductive grid is suitable for SEM.

In 104, the microcrystal is coated with an electrically conductive material to yield a coated microcrystal. Examples of suitable electrically conductive materials include metals or a combination of metals (e.g., platinum, silver, or chromium), electrically conductive polymers, and electrically conductive forms of carbon. Coating the microcrystal typically includes forming a layer having a thickness between about 25 nm and about 100 nm on the microcrystal.

In 106, the coated microcrystal is milled with a first ion beam to yield a milled microcrystal. The first ion beam may include gallium ions. Milling the coated microcrystal may include reducing a current of the ion beam by about a factor of ten (e.g., reducing a current of the ion beam from about 300 pA to about 30 pA). In some cases, milling of the coated microcrystal is monitored with an electron microscope. A length of a side of the milled microcrystal is typically between about 250 nm and about 500 nm.

In 108, the milled microcrystal is polished with a second ion beam to yield a polished microcrystal. In some implementations, the second ion beam is the same as (e.g., include the same type of ions as) the first ion beam. In certain implementations, the second ion beam is different than (e.g. includes a different type of ions than) the first ion beam. Polishing the milled microcrystal typically includes irradiating the milled microcrystal with an ion beam having a current between about 5 pA and about 25 pA. Polishing the milled microcrystal reduces the length of the side of the milled microcrystal to yield a polished microcrystal having a length of a corresponding side between about 150 nm and about 250 nm. Polishing the milled microcrystal may reduce the length of the side of the milled microcrystal by about 50 nm to about 100 nm.

A multiplicity of microcrystals may be disposed on the electrically conductive grid and processed according to process 100. For subsequent structural determination, polished microcrystals having a distance between an edge of the polished microcrystal and a bar of the electrically conductive grid is typically at least about 20 microns, and a distance between an edge of the polished microcrystal and an edge of an additional polished microcrystal on the electrically conductive grid is at least about 10 microns.

FIG. 2 is a flowchart showing operations in a microcrystal electron diffraction (MicroED) process 200. In 202, the polished microcrystal of process 100 is rotated while electrons are accelerated toward the polished microcrystal. The polished microcrystal is rotated continuously in a single direction. Rotating the polished microcrystal covers a total angular range of at least 60° (e.g., 70°, 80°, or 90°) of the polished microcrystal. The electron dose is typically <0.01 e$^-$/Å$^2$/s.

In 204, the electrons are diffracted from the polished microcrystal to yield a multiplicity of diffraction patterns. The diffraction patterns are typically captured with a fast imaging device.

In 206, the crystal structure of the polished microcrystal is assessed from the multiplicity of diffraction patterns. Assessing the crystal structure includes processing the diffraction pattern data in a manner similar to that used in X-ray crystallography. A resolution of the crystal structure is less than about 3 Å or between about 1 Å and about 2 Å. A completeness of the crystal structure is at least about 85%. A total exposure of the polished microcrystal is typically less than about 35 e$^-$Å$^2$, and values of $R_{work}$ and $R_{free}$ corresponding to the crystal structure are typically between about 20% and about 30%.

In some cases, operations 200 and 204 are conducted for two or more microcrystals, and operation 206 includes merging data from the two or more microcrystals to yield a structure of the microcrystals based on the merged data.

Application of MicroED for Small Molecules, Drug Discovery, Proteins, and Peptides Sample preparation. Amorphous powders were used for structure determination by MicroED without crystallization. Powder of carbamazepine was purchased from Sigma, and a small amount of the material (~1 mg) was added to a glass vial. Carbon grids were gently placed within the vial and gently shaken to get the powder stuck to the grid. This process was attempted using grids clipped for use in an FEI autoloader or with the grids themselves, and pretreatment with glow discharging was attempted. In this case, the crystallites on the grid were often too large for MicroED experiments. To obtain finer grains, a 1-10 mg amount of carbamazepine powder was placed on a glass cover slide, sandwiched with another glass cover slide, and ground into a finer powder by sliding the cover slides back and forth.

Recrystallization by evaporation was also performed. This was done by dissolving the powder in neat ethanol to a concentration of approximately 1 mg/mL, applying 1 μL of this solution to the grid, and allowing the solvent to evaporate. After adding the sample to the grid, the grid was plunged directly into liquid nitrogen and mounted into either a single tilt side entry holder or into an FEI autoloader for MicroED experiments in the transmission electron microscope (TEM) under cryogenic conditions.

The best crystal density and distribution of crystalline sizes for carbamazepine were obtained using grids that had not been glow discharged or clipped beforehand for use in a side entry holder, with samples prepared by the cover slip method of the amorphous powder described above. This approach for sample preparation for MicroED used a small amount of material and would be appropriate for any small molecule, peptide or protein that is available as a powder, seemingly amorphous material or a saturated solution, with applications to nerve agents, design of neutralizing agents, chemical weapons, chemical synthesis and intermediates, toxins and neurotoxins and structural identification of powders.

Identification of multiple forms of nanocrystals. An initial low-magnification montage was taken at 150× magnification to screen the overall grid quality and identify if material had stuck to the carbon film. This was followed by low-dose screening of the holey carbon grid was conducted in over focused diffraction mode at a nominal camera length of 6.9 m and looking for small, dark crystallites upon the grid. Crystals of carbamazepine appeared in several forms on the grid, with the best diffracting crystallites being less than 100 nm in cross-section and having at least one sharp edge visible. This approach demonstrates that several forms, structures, or crystalline material can be imaged and identified out of a single stock material, and is suitable for analytical purposes, identification of various products and various forms, forensics, identification of toxins, neurotoxins, and full structural characterization by MicroED using small amounts of material.

Collection of continuous rotation MicroED data from small molecules and peptides. Selected crystals were moved into eucentric, height by wobbling the stage to assure the crystal did not move during rotation. A select area aperture was used to record data from specific parts of the sample which was also illuminated by the parallel diffraction beam. The stage was continuously rotated at the appropriate speed with exposures being recorded as a movie using a CMOS based camera. A typical nano-der microcrystal could yield up to 140 degrees of MicroED data at doses less than 0.03 e-/A2/s without visible deterioration of diffraction quality. This approach to MicroED data collection can be used for any mixtures of materials that are crystalline even if by eye they may not be visible. This data collection scheme can also be used with direct electron detectors such as Falcon, K2 or DDD, or slower CCD cameras.

Identification of several crystalline forms from the same compound (polycrystallinity). From a grid overview, multiple crystal forms can be identified based on shape showing physical polymorphism of the molecules on the nanoscale. This imaging approach can be used to identify whether a sample contains multiple various forms, multiple assemblies or multiple different structures.

Multiple structural models identified from the same sample. MicroED datasets from single crystals were solved using ab initio direct methods in SHELX where multiple models of the compound were identified, as visible by different hits with combined figure of merit's (CFOMs) higher than 80. This analysis demonstrates that several structures of morphologies of the same molecule can be determined and identified from a single sample indicating that a heterogeneous mixture exists even in a seemingly pure sample of a single compound. This approach can be used for analytical analysis of samples, for forensics, drug discovery and design, interactions of small molecules with proteins and the design of protein-protein interactions, identification of various forms and the precise location of hydrogens available for bonding.

Different crystalline packing motifs solved from the same grid of amorphous powder. Within the same grid containing a single small molecule sample, several crystalline forms and molecular packing motifs could be unambiguously identified. Thus, this approach can be used to identify heterogeneity and various forms within a seemingly pure sample.

Characterization of dynamics and radiation damage m response to electron exposure. Multiple MicroED datasets can be collected from the same crystal and then merged to solve the structure. Structural changes in molecules can be observed as structural dynamics induced by radiation damage. Several data sets can be collected from a single nano crystal in MicroED using ultra low electron doses of less than 1 electron per squared Angstrom for a complete structure, allowing determination of molecular structures with minimal or no radiation damage and without reduction. This approach could facilitate work on REDOX reactions important for molecular interactions, drug design, and optimization and dynamics, the precise location of hydrogens available for bonding, and bond breakage and formation.

Sample preparation for protein microcrystals. Sample preparation can be a difficult, costly, and time consuming portion of a cryoEM experiment. Excess solvent and crystal area were milled away from samples that were too thick to be penetrated by the electron beam, allowing solution of a structure using continuous rotation MicroED from a milled crystal. This approach is applicable for samples that form crystals too large for MicroED, or that are embedded in thick solutions and cannot easily be blotted for analysis. Potential samples include proteins, membrane proteins in detergent, membrane proteins in lipidic-cubic phase matrices, peptides in thick solvent, and small molecules forming large crystals in viscous.

MicroED for high throughput drug discovery and optimization. MicroED provides a unique opportunity for structure-based drug design where high quality omit maps are required to accurately model bound small molecules. Tiny crystals allow efficient and homogeneous diffusion of small molecules into the nanocrystal leading to increased occupancy resulting in high quality omit maps necessary for identifying and determining the structures of the bound drugs de novo. Nanocrystals will be incubated with a cocktail of over a million small molecules, and only the best binders (those molecules that happen to have the highest affinity to the target) incorporate homogeneously into the crystal by efficient diffusion. Atomic resolution structures would be determined by MicroED and bound drugs identified based on the resulting high quality maps. Potential applications include drug development and optimization, identification of various forms of small molecules, allostery, ligand-target interactions, drug binding to substrate, molecular intra- and interactions binding optimization, high throughput drug discovery and optimization, structure based ligand identification, antigen-antibody characterization, identification of nerve agents and materials important for national security, structure based optimization of small molecules and peptides as well as toxins, structure based identification of small molecules, peptides and toxins and various forms, and the precise location of hydrogens available for bonding.

Natural products characterization. Natural products are chemical compounds produced by a living organism. These compounds have been (bund to have myriad of uses in humans, such as the anti-cancer activity of Taxol or the antibiotic properties of penicillin. Isolation of natural products is an important avenue of biological and chemical research. The active forms of these products are found in only trace amounts, making purification and crystallization for X-ray investigation expensive and challenging. Natural products isolated from living organisms can be roughly extracted and investigated in minute quantities that lead to atomic resolution structure solutions by methods described in this disclosure, as demonstrated in Ting et al Science 365, 280-284 (2019), which is incorporated herein by reference. Such methods are also applicable to drug discovery and characterization.

Determination of absolute configuration using internal markers. MicroED methods described in this disclosure can also be used to determine absolute chirality or stereochemistry of a molecule if a known internal marker exists. See, for example, Ting et al, Science 365, 280-284 (2019) and http://dx.doi.org/10.26434/chemrxiv.9807938.v1), both of which are incorporated herein by reference. In both cases, the internal markers were natural amino acids in the L-form. By determining the MicroED structure and identifying the L-configuration of these amino acid markers, it was possible to determine the absolute configuration of unknown parts of the small molecule in relation to the known marker. Applications of this approach include certification of drugs for the Food and Drug Administration (FDA), development of new drugs and small molecules, and natural products discovery.

EXAMPLES

Collection of Continuous rotation MicroED Data from Ion Beam Milled Crystals

Large proteinase K crystals were grown by vapor diffusion as typically done for X-ray crystallography. An entire 4 μL drop of crystals was transferred onto a freshly glow-discharged holey carbon grid. These grids were vitrified by plunging into supercooled ethane, and transferred to an FEI Versa focused ion beam (FIB)/scanning electron microscope (SEM) for milling without platinum coating. An overview of the grid in the SEM and by the FIB showed the grid overlaid with many large crystals of varying size (between ~5-300 μm). An ideal specimen for milling was identified in low magnification SEM and FIB imaging by looking for a very large, sharp-edged crystals surrounded by amorphous ice that was located more than 10 μm away from the copper grid bar. Crystals like this were easily found on every TEM grid tested, and several lamellae were milled on each grid. This demonstration targeted very large crystals that typically would not be amenable for analysis by MicroED.

A focused beam of gallium ions accelerated at 30 kV was used for milling. The surrounding media and the excess crystalline area were initially gross-milled using a beam current of 300 pA to clear away the large, thick, unwanted volumes above and below the sample to a thickness of approximately 1-3 μm. Subsequent reductions in the size of the crystal lamella came by milling away equal volumes above and below the initially milled volume with reduced current in a step-by-step fashion. The final lamella thickness was approximately 300 nm with the final volumes removed with a gallium beam current of 30 pA. The process of milling was monitored with SEM operated at 10 kV and 27 pA. The total time to mill a crystal of this size was approximately 10 minutes.

Following milling, the grids were transferred to an FEI Tales Artica 200 kV electron microscope equipped with a bottom mount CetaD CMOS detector for MicroED data collection. Location of the crystalline lamellae after milling was apparent in low-magnification images by direct search or the inspection of a grid atlas. The milled lamellae clearly stood out compared with un-milled regions, and the milled crystals appear as a dark particle surrounded by the bright milled region MicroED data were collected. The milled crystals yielded diffraction to ~2.5 Å resolution, indicating that the milling process did not damage the underlying crystalline material. A complete data set was collected from a single milled crystal by continuous rotation MicroED, where a single lamella was continuously rotated while the diffraction was collected as a movie on the CetaD detector. The total exposure during the MicroED experiments was approximately 4 $e^-Å^{-2}$ (total dose) with a dose rate of $0.02 e^- Å^{-2}$ $s^-$ and a rotation speed of 0.3 degrees per second. The entire data set was collected in less than 5 minutes. The structure of proteinase K was solved by molecular replacement and refined to a final resolution of 2.75 Å with acceptable $R_{work}$ and $R_{free}$ of 23% and 28%, respectively. Statistics of the model are provided in Table 1.

The milling process did not appear to severely damage the underlying structure of the crystalline lattice. The only electron dose potentially absorbed by the lamella during FIB/SEM came from the final image taken at low magnification used to view the lamella. This dose should be surface-limited as the penetration depth of ~5 keV electrons is only a few nanometers, suggesting that any irradiation by low energy electrons prior to milling has limited impact. Effects due to the focused ion beam imaging or the stress from physically milling away portions of the crystal did not manifest themselves in the final density. However, these effects may have led to a reduction of the observed resolution, or global damage to the lattice, limiting the resolution to ~2.7 Å whereas the structure of proteinase K was previously determined by MicroED to 1.8 Å resolution. Gallium is expected to absorb into solid surfaces at grazing incidence angles, and might have absorbed into the crystal similarly to gas or liquid phase soaking in isomorphous replacement experiments. Gallium was not observed in the final density map. However, this may be a possibility for thinner lamellae.

The stricture of proteinase K was solved by continuous rotation MicroED using a single crystal lamella milled by a gallium ion beam to a thickness of 300 nm. Results show that solving complete structures from single crystals milled by a FIB is possible and that the underlying crystalline material was not severely affected by the technique. This study broadens capabilities of MicroED in that crystals that are too fragile to survive fragmentation methods or harsh blotting conditions are amenable for data collection after FIB milling. Likewise, milling of crystals grown in lipidic cubic phase or other viscous solvents may now be possible. Thus, this method greatly increases the potential scope of what can be done with MicroED, and adds a level of tunable control to all future MicroED experiments.

Sample preparation and data collection and processing. Proteinase K (*E. album*) was purchased from Sigma and used without further purification. Crystals were grown in 24-well trays by sitting drop vapor diffusion using micro bridges (Hamilton). Drops were formed by combining 2 μL of mother liqueur (1.25M Ammonium Sulfate 50 mM Tris-HCl pH 8,5) and 2 μL of protein solution (20 mg ml$^{-1}$ Proteinase K from *E. album* 50 mM Tris-HCl pH 8.5).

Protein crystals were taken directly from the drop using a 10 μl pipette with the tip cut to increase its width. Approximately 4 μl of protein solution was applied to the carbon side of a Quantifoil R 2/2 200 mesh finder grid (Ted Pella) in 100% humidity inside an FEI Vitrobot Mark IV after glow discharging for 60 s at 15 μA. Excess water on the grids was removed by gently pressing filter paper to the copper back side for 10 s. Grids were then plunged directly into super cooled ethane without further blotting. Grids in ethane were transferred to liquid nitrogen and stored in a dewar until use.

Grids were clipped and loaded into a FEI Versa FIB/SEM with a cryo-transfer system (PP3010T, Quorum Technologies). During FIB milling and transfer, samples were kept at liquid nitrogen temperature. SEM and FIB images were taken at various magnifications using dwell times between 100 ns and 1 μs. For milling, the gallium beam was accelerated by a voltage of 30 kV and the stage was tilted at angles of 17°-20°. The milling current was gradually reduced from 300 pA in the first round to 30 pA as lamellae were thinned to their final thicknesses. SEM with 10 kV and 27 pA was used to monitor the milling progress.

Grids were loaded from the FIB/SEM to an FEI Talos Artica operating at liquid nitrogen temperatures. Lamellae were identified in low magnification imaging using the low-dose control at a typical magnification of 100×LM mode with a spot size 11. After identification of lamellae, continuous rotation MicroED data was collected. Briefly, a selected area aperture was used to minimize background noise, and the stage was rotated at a constant rate of 0.30 degrees per second while a parallel beam of electrons scattered from the sample.

Data was converted from FEI's SER format to SMV using in-house developed software. SMV images were indexed and integrated with XDS; scaling and merging was performed using XSCALE. The merged dataset was phased by molecular replacement in Phaser with 5i9s as the search model, resulting in a final TFZ score >33 and LLG >1000. The structure was refined with phenix refine using electron scattering factors to a final $R_{work}/R_{free}$ of 23/28% at a resolution of 2.75 Å.

Number values used to calculate the statistics in Table 1 were given by the total number of reflections and the number of unique reflections.

TABLE 1

Parameters and measures for data collection and analysis.

| Data | Parameter | Measure |
| --- | --- | --- |
| Data collection | Accelerating voltage (kV) | 200 |
| | Electron source | Field emission gun |
| | Total accumulated exposure (e$^-$) | 4 |
| | Crystals (#) | 1 |
| | Microscope | Thermo-Fischer Talos Artica |
| | Camera | Ceta-D |
| | Rotation rate (°/s) | 0.297 |
| | Wavelength (Å) | 0.0251 |
| Data analysis | Resolution range (Å) | 44.86-2.75 (2.848-2.75) |
| | Space group | P $4_3 2_1 2$ |
| | Unit cell (a, b, c, α, β, γ) | 69.49 69.49 109.89 90 90 90 |
| | Total reflections (#) | 31156 (3145) |
| | Multiplicity | 4.7 (4.9) |
| | Completeness (%) | 88.75 (89.61) |
| | Mean I/σ(I) | 2.93 (0.98) |
| | Wilson B-factor | 36.4 |
| | R-merge | 0.408 |
| | R-plm | 0.2085 |
| | CC½ | 0.92 |
| | CC* | 0.979 |
| | R-work | 0.2306 |
| | R-free | 0.2780 |

Qualitative Analyses of Polishing and Precoating FIB Milled Crystals for MicroED Proteinase K crystals, all from the same crystallization drop, were used to create two cryoEM grids under identical blotting and freezing conditions. One of the grids was coated with a thin layer of platinum while the other was not. These grids were then clipped and loaded on to a FIB-SEM instrument, and the crystals were subsequently milled into thin ~200-nm lamellae for MicroED investigation.

Crystals were selected for milling using identical selection criteria. Namely, crystals were approximately similar in size, and were at least 20 mm away from the nearest grid bar, not within 10 mm of another crystal, and not along the milling path of another selected crystal to prevent additional exposure to the FIB. These stringent constraints reduced the number of potential crystals to ~10 crystals per grid. These crystals were milled to ~200 nm in thickness either with or without platinum coating. Data were collected from eight crystal lamellae of proteinase K without platinum coating and from five lamellae with platinum coating. Grids were transferred to a TEM for MicroED data collection. Continuous rotation data were collected from each lamella, covering a total angular range of 60° per crystal and using a total exposure of 3 e$^-$ Å$^{-2}$. All data were collected and processed using the same protocol, and, because the completeness from each lamella was sufficiently high, a structure was determined from each well-diffracting lamella.

For both the precoated and uncoated grids, each crystal was milled into a thin lamella approximately 300 nm thick. This initial milling followed our previously used protocol of slowly stepping down the beam current from >300 pA to 30 pA. For two lamellae from each grid, an additional ~50 nm was milled from each side of the lamellae to reach the final thickness of 200 nm. For all of the rest of the crystals, we milled away these last 50 nm using and ultralow beam current of 10 pA to create 200-nm-thick lamellae, a process typically referred to as polishing. This current was to the lowest possible setting on the FIB-SEM instrument. This step was thought to prevent morphological pathologies in the crystals due to the damaging nature of the high-current gallium beam, but greatly increased the amount of time to reach the final lamella thickness.

Compared with polished samples, the unpolished crystals, whether coated or not, exhibit visible pathologies when imaged, most notably clear striations parallel to the direction of the ion beam. Crystals that were neither coated with a platinum layer nor polished resulted in either no diffraction at all or lamellae that had broken away from the grid entirely. For the precoated samples, some diffraction spots were observed to be split or appeared smeared, similarly to diffraction from multiple crystals. However, these reflections were ultimately integrated, with a noticeable decrease in resolution and worse merging statistics (Table 2), internal consistency measures such as merging R factors and $CC_{1/2}$ were also worse, but that may again be a consequence of the decreased resolution.

plete to allow a structure to be determined by molecular replacement using a search model. Structures were refined using electron-scattering factors, automatic solvent picking, and without any manual intervention such as modeling ions. This approach was chosen to eliminate user bias and assure proper comparisons between solved structures.

A complete list of statistics is presented in Table 2. The differences in completeness for these crystals are expected, as proteinase K tends to orient randomly on the grid. The average maximum resolution for these crystals was found to be 2.28 Å. The averaged, final refinements of these crystals had an $R_{work}$ of 23.2% and an $R_{free}$ of 28.1%, and showed no clear pathologies or issues in the densities.

A second grid with crystals from the same crystallization well was prepared identically. This grid was coated in a thin layer of platinum (~50 nm) prior to being loaded into the

TABLE 2

Statistics and analysis for MicroED data collected under different preparation conditions.

| Parameters | Polished and Uncorrect | | | | Unpolished and Coated | | Polished and Coated | | |
|---|---|---|---|---|---|---|---|---|---|
| Crystal # | 2 | 5 | 7 | 8 | 9 | 12 | 10 | 11 | 13 |
| Data Collection | | | | | | | | | |
| Accelerating voltage (kV) | 200 | | | | | | | | |
| Electron source | field-emission gun | | | | | | | | |
| Total exposure ($e^-Å^{-3}$) | 3 | | | | | | | | |
| Wavelength (Å) | 0.0251 | | | | | | | | |
| No. of crystals | 1 | | | | | | | | |
| Microscope | Thermo Fisher Talos Arctica | | | | | | | | |
| Camera | CetaD | | | | | | | | |
| Rotation rate (° $s^{-1}$) | 0.2 | | | | | | | | |
| Data Analysis | | | | | | | | | |
| Resolution range (Å) | 36.06-2.17 (2.248-2.17) | 41.63-2.176 (2.254-2.18) | 43.47-2.59 (2.683-2.59) | 35.41-2.17 (2.248-2.17) | 90.23-2.06 (2.154-2.08) | 33.66-2.07 (2.744-2.07) | 28.39-1.91 (1.978-1.91) | 30.07-1.85 (1.916-1.85) | 33.54-1.79 (1.854-1.79) |
| Unit Cell | | | | | | | | | |
| (a = b, c) (Å) | 67.3, 104.9 | 67.6, 105.7 | 67.5, 105.2 | 67.5, 105.6 | 67.6, 104.5 | 67.5, 105.1 | 67.5, 105.9 | 67.2, 107.0 | 67.1, 107.0 |
| ($\alpha = \beta = \gamma$) (°) | 90 | 90 | 90 | 90 | 90 | 90 | 90 | 90 | 90 |
| Space group | p $4_32_12$ | | | | | | | | |
| Total reflections | 63,495 (6,293) | 63,830 (6,496) | 34,644 (3,727) | 61,959 (6,373) | 70,454 (7,196) | 60,629 (5,069) | 88,818 (9,016) | 99,035 (10,392) | 100,799 (8,463) |
| Multiplicity | 6.3 (6.4) | 4.8 (5.0) | 4.7 (5.0) | 5.3 (5.6) | 5.1 (5.3) | 6.9 (5.9) | 5.0 (5.2) | 5.9 (6.3) | 6.8 (5.8) |
| Completeness (%) | 71.26 | 94.46 | 92.89 | 84.79 | 90.80 | 57.59 | 90.41 | 76.93 | 62.36 |
| Mean I/σ(I) | 3.36 (0.51) | 2.68 (0.51) | 2.49 (0.89) | 3.37 (0.81) | 3.65 (0.75) | 4.04 (0.93) | 4.16 (0.60) | 4.87 (1.00) | 3.95 (0.72) |
| Wilson B factor (Å) | 32.5 | 32.46 | 26.8 | 30.08 | 29.74 | 33.21 | 26.74 | 24.47 | 25.71 |
| $R_{p/m}$ | 0.167 | 0.222 | 0.275 | 0.167 | 0.156 | 0.109 | 0.108 | 0.107 | 0.078 |
| $CC_{1/2}$ | 0.966 | 0.956 | 0.888 | 0.956 | 0.973 | 0.975 | 0.984 | 0.987 | 0.991 |
| $R_{work}$ | 0.220 | 0.223 | 0.256 | 0.229 | 0.223 | 0.218 | 0.197 | 0.198 | 0.198 |
| $R_{free}$ | 0.285 | 0.265 | 0.310 | 0.264 | 0.258 | 0.269 | 0.234 | 0.234 | 0.236 |

Eight crystals that met the selection criteria were identified from the uncoated grid. These crystals appeared to be randomly oriented upon the carbon support film. Each of these crystals was milled to a thickness of ~200 nm. Of these, two were not polished and six were polished. These grids were transferred to a TEM, and continuous rotation MicroED data were collected from each crystalline lamella. Of these eight lamellae, four yielded clear diffraction spots, three showed no diffraction or were detached from their support, and one diffracted to ~8 Å and could not be indexed to the correct point group, even when enforcing the known unit cell. All four integrated datasets were sufficiently com- FIB-SEM instrument. Using the same criteria as the uncoated grid, five crystals were located and milled. Three of these were polished and two unpolished, as indicated. Continuous rotation MicroED data were then collected as above. All five crystals yielded diffraction that indexed correctly. Each crystalline lamella was solved similarly to the uncoated lamellae above, and the individual statistics for these solutions are also presented in Table 2. On average, these crystals diffracted to a resolution of 1.94 Å with an $R_{work}$ of 20.6% and an $R_{free}$ of 24.6%. Statistics for individual platinum-coated lamellae are given in Table 2.

To compare the overall structures from both preparations with minimal TEM exposure, the first half of each dataset was merged for either the uncoated or coated lamellae that had been polished. These merged datasets were of overall high completeness and multiplicity, and were subjected to a total exposure of only 1.5 e⁻·Å⁻². These are referred to as "low-dose" for the uncoated merge, and "low-dose platinum" (Table 3). The resolution for these structures was again chosen as the lowest resolution beyond which $CC_{1/2}$ was no longer significant as indicated by Student's t test at the p=0.1 level. It appears that precoating the samples prior to milling led to a higher-resolution structure with improved refinement statistics. The low-dose uncoated dataset had a resolution of 2.16 Å with an $R_{pim}$ of 15.3% and mean I/σI of 3.7, whereas the predated dataset extended to 1.85 Å with an $R_{pim}$ of 9.4% and mean I/σI of 5.4 using the same criteria. The similarities, and successful merging of these the individual crystal lamellae, indicate that there were no issues with non-isomorphism between these structures. Relevant structural and merging statistics of this structure are listed in Table 3.

TABLE 3

MicroED data and analysis from low-dose, merged crystals.

| Parameter | Low-Dose Uncoated | Low-Dose Precoated |
|---|---|---|
| Data Collection | | |
| Accelerating voltage (kV) | 200 | |
| Electron source | field-emission gun | |
| Total exposure (e⁻ Å⁻²) | 1.5 | |
| Wavelength (Å) | 0.0251 | |
| No. of crystals | 4 | 3 |
| Microscope | Thermo Fisher Talos Arctica | |
| Camera | CetaD | |
| Rotation rate (° s⁻¹) | 0.2 | |
| Data Analysis | | |
| Resolution range (Å) | 41.52-2.16 (2.237-2.16) | 32.08-1.85 (1.916-1.85) |
| Space group | P 4₃2₁2 | P 4₃2₁2 |
| Unit cell | | |
| (a = b, c) (Å) | 67.5, 105.4 | 67.3, 106.7 |
| (α = β = γ) (°) | 90 | 90 |
| Total reflections | 126,914 (12,952) | 150,310 (15,323) |
| Multiplicity | 9.4 (9.8) | 7.6 (7.9) |
| Completeness (%) | 98.87 (97.66) | 90.75 (87.18) |
| Mean I/σI | 3.72 (0.87) | 5.40 (1.14) |
| Wilson B factor | 35.2 | 25.4 |
| $R_{pim}$ | 0.153 | 0.094 |
| $CC_{1/2}$ | 0.969 | 0.987 |
| $R_{work}$ | 0.227 | 0.187 |
| $R_{free}$ | 0.252 | 0.225 |

The overall statistics for each set of crystals indicate that coating with platinum may lead to a higher success rate and result in higher-quality data. Every lamella that produced indexable diffraction in this study resulted in a high-resolution structure solution. Only half of the uncoated crystals (4/8) could be successfully processed, whereas all (5/5) of the coated crystals yielded well-refined structures. Two crystals from each grid were milled without a final polishing step. The coated but unpolished crystal lamellae produced diffraction that ultimately led to a structure, but these lamellae had overall poorer quality than the coated, polished lamellae. These results are consistent with disruption of the lattice by radiation damage, resulting in diminished resolution and, thus, poorer processing statistics.

Trends in the analysis indicate that precoating together with polishing yielded the best results. The quality metrics of success rate, maximum resolution, $R_{pim}$, I/σI, number of modeled waters, and $R_{free}$ were chosen to compare between the uncoated and precoated lamellae. Here, the trend is more pronounced between the different approaches. The uncoated and unpolished lamellae were unsatisfactory and therefore omitted from the statistical results. The precoated and unpolished lamellae tended to be better than those uncoated and unpolished. The best data typically came from lamellae that were both precoated and polished.

The dose-fractionated datasets created from both the uncoated and precoated, polished lamellae were of overall much higher quality than any of the individual lamellae. Comparing individual statistics between the two merges demonstrates that precoating the grids led to better quality data. Continuous, unbroken density was observed for disulfide bonds, indicating that dose fractionation resulted in structures with minimal damage from exposure to the electron beam.

The resolution limit of each dataset was chosen based on the significance of the $CC_{1/2}$ value (p=0.1, Student's t test). Lamellae coated with platinum consistently resulted in higher resolution. Although primary gallium damage is not believed to be the culprit for the reduction of resolution, discount secondary effects that may constitute the majority of damaging events in traditional macromolecular crystallography cannot be discounted. The coating comes with the added benefits of increased contrast during the FIB-SEM stages and prevents exposure to electrons and ions during the FIB-SEM experiments. The total exposures to both sets of crystals during MicroED experiments in the TEM were identical. The stability added by the platinum layer may serve to increase the strength of the base both while it experiences a shear force from the ion beam and during the mechanical stresses of loading and unloading the sample from the FIB-SEM to the TEM. Initial observations of lamellae breaking during the transfer process of uncoated grids would seem to support this hypothesis.

A platinum layer thicker than that used (~50 nm) may further reduce radiation damage to the specimens from the gallium beam during the milling procedure. However, thicker layers make locating smaller crystals more difficult by washing out the fine features seen with either a thin or no platinum layer, and may even not cover the areas occluded by sharp edges. Indeed, even a thin layer of platinum coating made locating crystals using FIB imaging more difficult than in the uncoated grid.

Lamellae with an additional platinum layer were not coated after milling, as is common practice in preparing lamellae for imaging. This is typically done to prevent charging of the sample during imaging of the sample in the TEM. Charging manifests as blurring of images. Diffraction is translationally invariant, and this would not benefit our lamellae. Furthermore, the resolution of our diffraction experiments is highly sensitive to sample thickness due to absorption. Any additional material added to the lamellae, particularly of a high Z material, may be detrimental to collection of MicroED data.

The effects of precoating grids with platinum and polishing milled lamellae on MicroED data quality were investigated. Results suggest that grids precoated with a thin layer of platinum consistently improve MicroED data quality. Adding a polishing step at very low ion-beam current was believed to be necessary to observe diffraction for crystals on the uncoated grid, but did not prevent successful integration of diffraction data from precoated grids. The first half of each dataset from either the coated or uncoated, polished grids were merged to create complete dose-fractionated datasets with minimal exposure and better statistics for comparison. Even in this case, the very best uncoated crystals were of poorer overall quality than the precoated crystals. Precoating is believed to limit radiation damage to the crystals, increase, the physical robustness of the preparations, and lead to improved crystallographic statistics and structure.

Additional Examples

Exhibits 1-6 provide additional examples.

Unless otherwise defined, all technical and scientific terms used herein have the same meaning as commonly understood by one of ordinary skill in the art which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

In accordance with the present invention, there may be employed conventional molecular biology, microbiology, biochemical, and recombinant DNA techniques within the skill of the art. Such techniques are explained fully in the literature. The invention will be further described in the following examples, which do not limit the scope of the methods and compositions of matter described in the claims.

It is to be understood that, while the methods and compositions of matter have been described herein in conjunction with a number of different aspects, the foregoing description of the various aspects is intended to illustrate and not limit the scope of the methods and compositions of matter. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset of combination of these is also specifically contemplated and disclosed.

What is claimed is:

1. A sample preparation method comprising:
    disposing a microcrystal on an electrically conductive grid;
    coating the microcrystal with an electrically conductive material to yield a coated microcrystal;
    milling the coated microcrystal on the electrically conductive grid with a first ion beam to yield a milled microcrystal, wherein a length of a side of the milled microcrystal is between about 250 nm and about 500 nm; and
    polishing the milled microcrystal with a second ion beam to yield a polished microcrystal on the electrically conductive grid, thereby reducing the length of the side of the milled microcrystal to yield a polished microcrystal having a length of a corresponding side between about 150 nm and about 250 nm.

2. The sample preparation method of claim 1, wherein the microcrystal comprises a protein.

3. The sample preparation method of claim 1, wherein coating the microcrystal comprises forming a layer having a thickness between about 25 nm and about 100 nm on the microcrystal.

4. The sample preparation method of claim 1, wherein the electrically conductive material comprises a metal.

5. The sample preparation method of claim 4, wherein the metal comprises platinum, silver, or chromium.

6. The sample preparation method of claim 1, wherein the electrically conductive material comprises carbon.

7. The sample preparation method of claim 1, wherein the first ion beam, the second ion beam, or both comprises gallium ions.

8. The sample preparation method of claim 1, wherein milling the coated microcrystal comprises reducing a current of the ion beam by about a factor of ten.

9. The sample preparation method of claim 8, wherein reducing the current of the ion beam by about a factor of ten comprises reducing a current of the ion beam from about 300 pA to about 30 pA.

10. The sample preparation method of claim 1, wherein polishing the milled microcrystal reduced the length of the side of the milled microcrystal by about 50 nm to about 100 nm.

11. The sample preparation method of claim 10, wherein polishing the milled microcrystal comprises irradiating the milled microcrystal with an ion beam having a current between about 5 pA and about 25 pA.

12. The sample preparation method of claim 1, wherein a distance between an edge of the milled microcrystal and a bar of the electrically conductive grid is at least about 20 microns.

13. The sample preparation method of claim 1, wherein a distance between an edge of the polished microcrystal and an edge of an additional polished microcrystal on the electrically conductive grid is at least about 10 microns.

14. The sample preparation method of claim 1, further comprising monitoring the milling with a scanning electron microscope.

15. A method of assessing a crystal structure of the polished microcrystal of claim 1, the method comprising:
    rotating the polished microcrystal while accelerating electrons toward the polished microcrystal;
    diffracting the electrons from the polished microcrystal to yield a multiplicity of diffraction patterns; and
    assessing, from the multiplicity of diffraction patterns, the crystal structure of the polished microcrystal.

16. The method of claim 15, wherein a resolution of the crystal structure is less than about 3 Å or between about 1 Å and about 2 Å.

17. The method of claim 15, wherein a completeness of the crystal structure is at least about 85%.

18. The method of claim 15, wherein the rotating covers a total angular range of at least 60° of the polished microcrystal.

19. The method of claim 15, wherein a total exposure of the polished microcrystal is less than about 35 $e^- \text{ Å}^{-2}$.

20. The method claim 15, wherein values of $R_{work}$ and $R_{free}$ corresponding to the crystal structure are between about 20% and about 30%.

* * * * *